Oct. 23, 1951 H. SCHLAICH 2,572,059
TEMPERATURE RESPONSIVE DEVICES, BIMETALLIC COILS FOR USE
THEREIN AND BLANKS FOR MAKING SUCH COILS
Filed March 11, 1947 3 Sheets-Sheet 3
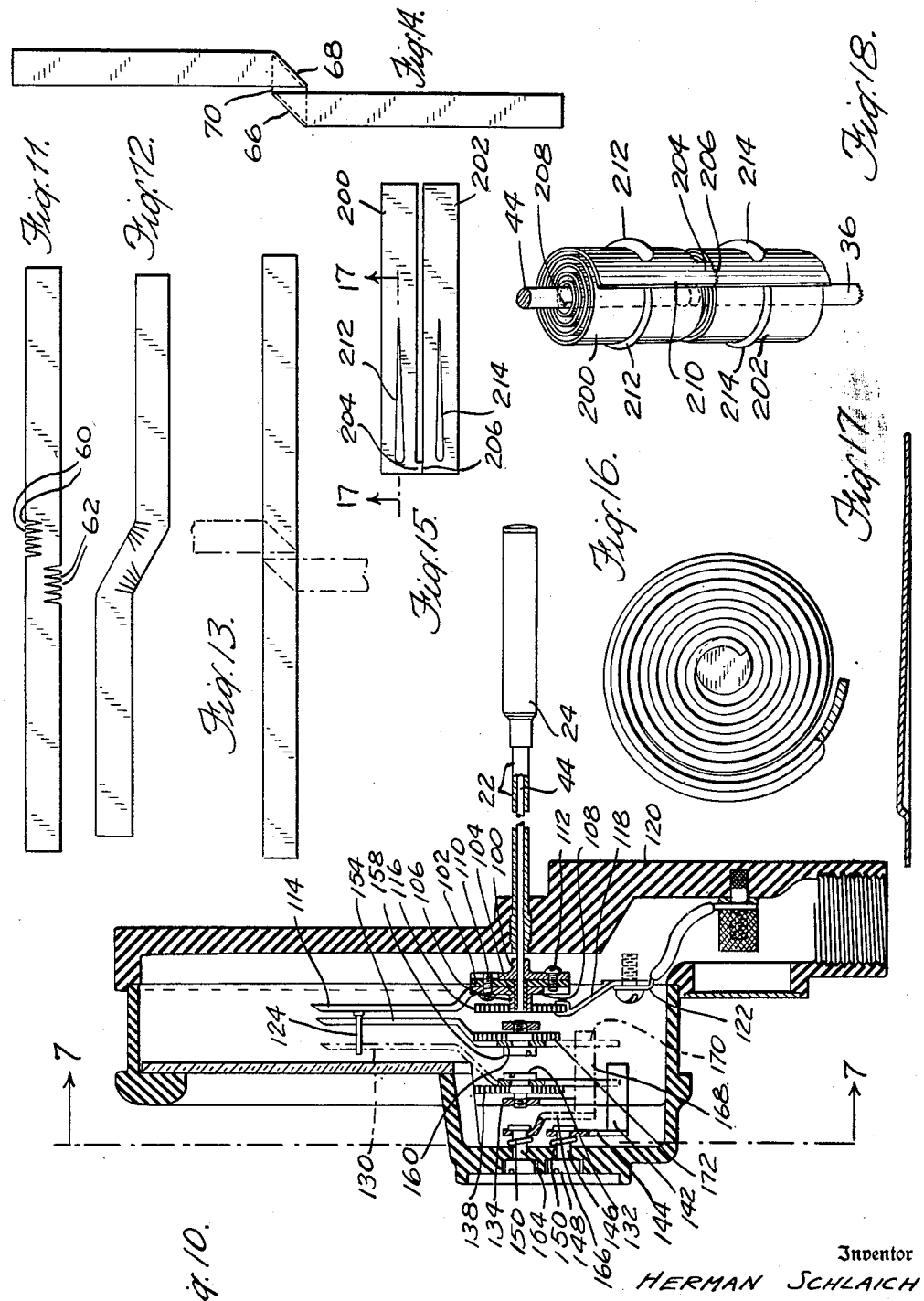
Inventor
HERMAN SCHLAICH
By
Moses, Nolte, Crews & Berry
Attorneys

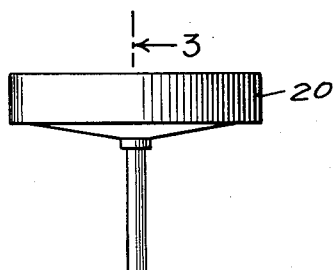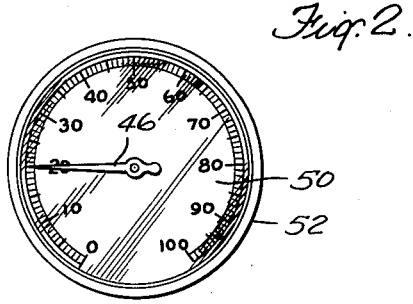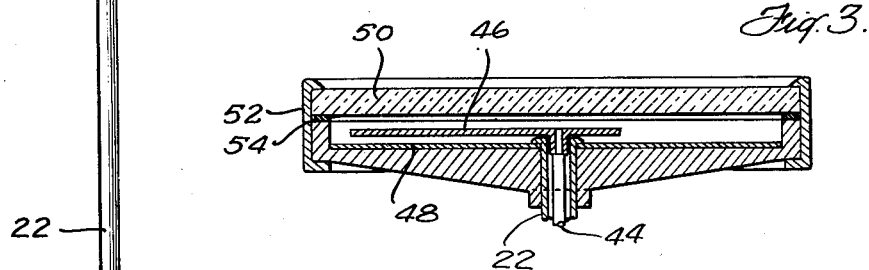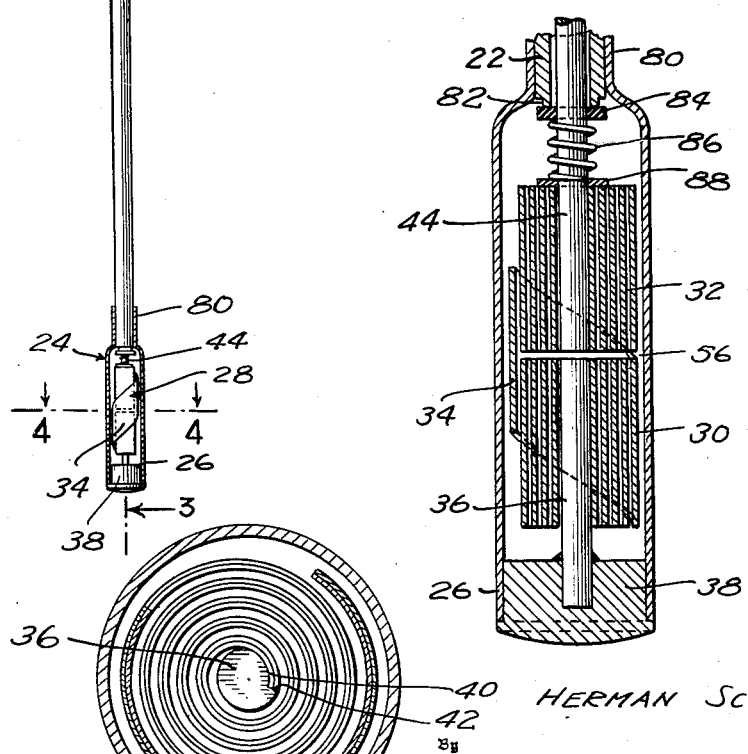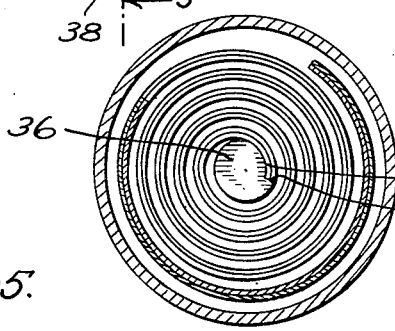

UNITED STATES PATENT OFFICE 2,572,059

TEMPERATURE RESPONSIVE DEVICES, BI-METALLIC COILS FOR USE THEREIN, AND BLANKS FOR MAKING SUCH COILS

Herman Schlaich, Elmhurst, N. Y.

Application March 11, 1947, Serial No. 733,944
In Switzerland October 1, 1946

10 Claims. (Cl. 73—367)

This invention relates to temperature-responsive devices embodying a bimetallic coil of novel construction. It also relates to such coils and blanks for making the same.

In the making of temperature-responsive instruments and devices, it is important to utilize a temperature-responsive element which is compact so that it takes up little room and can be located as near as possible to the optimum position for responding to the temperature conditions by which it is intended to be influenced. It is also important to utilize a temperature-responsive element of such nature that it will respond quickly to temperature changes. For this reason it is important that the element be in close thermo-conductive relationship with the surrounding medium, the temperature of which is to be indicated or which is to influence the operation of the device. This result will not be secured, for example, if the temperature-responsive element is of such nature that the thermo-responsive member such as the bimetallic coil is so wound that it must be enclosed in a loose fitting shell or casing which will space the coil a substantial distance from actual contact with the medium to the temperature of which the coil is intended to respond. It is also important, if the instrument or device is of such nature that any substantial force is required to operate it, that the temperature-responsive element shall have sufficient power to cause a firm and positive operation of the device. For example, in case the thermometer which is used under severe operating conditions, the thermometer pointer may be subject to vibration due to shock. This is particularly noticeable in the case of thermometers or thermostatic devices used to close electric contacts. In such devices if the contact is not firmly closed and held closed, vibration will cause separation of the contacts and consequent arcing and false reading or improper operation of the control devices. With the foregoing considerations in view, it is an object of the present invention to provide a temperature-responsive element including a bimetallic coil, the construction of which is such that great rapidity of action is assured. The coil is of compact form so that it may be located at the exact location where best operation will be secured. The form of the coil also permits it to be made of such dimensions as to secure ample power for operation of mechanical devices for closing or opening of electrical contacts, etc.

Another object of the invention is to provide a coil construction and blank for making the same by which coils of the desired form may be quickly and easily made out of bimetallic material having the characteristics necessary for securing rapid and effective operation. In order to secure rapidity and sensitiveness in operation in a bimetallic temperature-responsive device, it is important that as thin a bimetallic strip as possible be utilized and that the strip be coiled in as compact form as is practicable. If the bimetallic material is thick, it takes longer for temperature changes to affect it and, therefore, it is sluggish in operation. Furthermore, it cannot be coiled into as compact form as a coil of very thin material. Therefore, when embodied in a temperature-responsive element, it is necessarily enclosed in a casing of relatively large volume and cannot be so responsive to changes in temperature in the ambient fluid. Another characteristic of bimetallic coils is that their power depends upon the width of the strip of which the coil is made rather than upon the thickness. In order to secure substantial power, therefore, a wide strip must be used.

In accordance with the present invention, a bimetallic coil is provided which is closely wound of very thin bimetallic material, the coil being of such form that it may be formed of material of very much greater width and thickness without departing from a coil form of minimum overall dimensions. The form of coil best suited to accomplish the objects above set forth is made of a bimetallic metal of very thin gauge, which is formed into blanks of such shape that it is possible to coil the blank into a double coil starting from the inside at one end and coiled for a number of turns in a spiral around a central axis to a bridge section at the middle of the blank, the end of the blank beyond the bridge section being coiled progressively inward in a spiral, the two coil portions being in axial alignment. By forming the coil out of very thin bimetal of substantial width, the coil is given ample power to properly operate the instrument or device, and at the same time the total dimensions of the coil are kept at a minimum. The center convolution of each coil portion is wound closely about a driving or driven shaft as the case may be, the end of such convolution preferably being fitted in a shallow recess at one side of the shaft in which it may be firmly secured by welding. With such a construction, shafts of minimum diameter may be utilized and there is no waste space in the center of the coil. The double coil construction is also characterized by a very slight change in outer diameter as the coil expands or contracts because the expansion or contraction of the two coil parts to a certain extent offset each other in so far as expansion or contraction in diameter are concerned, although the effect of the two coil portions is cumulative in producing rotative movement of the driven shaft. A sufficient number of convolutions may be embodied in a very compact form to secure rotation of the pointer or movable element of the device through as much as 360 degrees.

Owing to the fact that the coil has comparatively little expansion in circumference it may be enclosed in a shell fitting the coil with but slight clearance. Thus, the enclosing shell constituting the exposed surface of the thermo-responsive element is of minimum dimensions and is close to the bimetallic coil and the latter is, therefore, quickly influenced by the temperature of the liquid or fluid medium in which the temperature-responsive element is located. Preferably, the casing is filled with a liquid of good heat transmitting properties, such as oil or glycerin so as to transfer the heat as quickly as possible from the enclosing shell to the coil itself.

An important feature of the invention comprises the blank of thin bimetallic material of such shape that it may readily be coiled into the double coil form desired.

Other objects and advantages of the invention will appear in the course of the following description of certain preferred embodiments chosen to illustrate the principles thereof.

In the accompanying drawings,

Fig. 1 is a side elevation of an indicating thermometer embodying one form of temperature-responsive element;

Fig. 2 is a view of the face of the thermometer shown in Fig. 1;

Fig. 3 is a central longitudinal section of the thermometer head on an enlarged scale;

Fig. 4 is a central longitudinal section of the temperature-responsive end of the thermometer on a still further enlarged scale;

Fig. 5 is a transverse section taken on the line 5—5 of Fig. 4 on a further enlarged scale;

Fig. 10 is a longitudinal section of the thermometer shown in Fig. 9, the section being taken on line 10—10 of Fig. 9;

Figs. 11 and 12 are plan views showing how blanks for forming double coil bimetallic elements may be formed from a straight strip of bimetallic material;

Figs. 13 and 14 are plan views showing another way of forming the blanks out of a straight strip of bimetallic material;

Fig. 15 is a plan view of a blank for forming another form of duplex coil;

Fig. 16 is a horizontal section of a coil made from the blank of Fig. 15, the scale being enlarged;

Fig. 17 is a fragmentary horizontal section of the blank shown in Fig. 15 on an enlarged scale, the sections being taken on lines 17—17; and Fig. 18 is a perspective view of the coil shown in Fig. 16.

Figure 6:
Fig. 6 is a plan view of a blank utilized for making the bimetallic coil of the form shown in Figs. 1, 4 and 5, the scale being the same as that shown in Fig. 1, which is approximately full size.

In illustrating the bimetallic metal in the drawings, no attempt has been made to show the two layers of metal separately, because of the smallness of the scale, except in Fig. 5 which has been enlarged sufficiently to permit illustration of the two layers of metal. It is to be understood, that in all cases the coils and the blanks for making the same are to be made of two permanently united layers of metals having different coefficients of expansion whereby the metal will be caused to warp or change its shape when subjected to changes in temperature.

Referring to the form of instrument shown in Figs. 1 to 5, these figures illustrate a simple form of thermometer having a head 20, a stem 22 and a "bulb" or thermo-responsive end 24. Inside of the casing 26 of the thermo-responsive end of the thermometer is a double coiled bimetallic element 28. This element comprises two axially aligned coiled portions 30 and 32 which are connected by a bridge convolution 34. The inner convolution of the coil portion 30 is secured to a fixed shaft 36 which may be supported in any suitable manner as by being tightly fixed in a cap or plug 38 which is sealed in the lower end of the shell or casing 26. The end of the inner convolution is preferably secured to the shaft by providing in the latter a longitudinal groove or depression having a helically curved wall portion 40 and an end wall portion or shoulder 42, the wall portion 40 curving inwardly from the cylindrical surface of the shaft with which it merges towards the bottom of the shoulder 42 so that the groove increases in depth towards the shoulder. The shoulder 42 is preferably the same height as the thickness of the bimetallic material, the end of which is secured in the groove preferably by welding. With this construction, the bimetallic coil springs from the shaft, so to speak, in a smooth curve and it may be coiled around the shaft with only the minimum clearance necessary to enable one convolution to escape actual contact with the next. The dimensions of the coil may thus be kept to an absolute minimum. Furthermore, as the groove in the shaft does not weaken it substantially as would be the case if the shaft were transversely slotted, the diameter of the shaft itself may be kept to a minimum which assists in reducing the maximum diameter of the coil. The center convolution of the coil portion 32 is secured to the end of a rotatable arbor 44 in the same manner as the end of the coil portion 30 is secured to the shaft 36. The arbor 44 passes through the tubular stem 22 of the instrument and it is connected at its upper end to the movable member of the instrument, such as the indicating hand 46, which is mounted to move over the graduated dial 48 in the instrument head. In the construction shown, the instrument head is covered by a crystal 50 which is secured in place by a bezel ring 52, a packing ring 54 being preferably provided so as to hermetically seal the chamber in which the indicating hand moves.

It is to be noted that with the double coil construction, both ends of the double coil are located near the axis of the coil. This permits the free end of one coil portion to be anchored to a central fixed shaft 36, while the inner end of the other coil portion is anchored to the end of the movable arbor 44. The shaft 36 and arbor 44 are mounted in axial alignment. There is no outer free end of the coil which has to be anchored to a support outside of the coil. This gives a very simple structure and also permits the coil to be enclosed in a shell closely surrounding the coil with a minimum of clearance. If it were necessary to provide an anchor for the outer free end of the coil between the outer convolution of the coil and the shell, the shell would have to be spaced much further away from the coil than in the construction of the invention.

The bimetallic temperature-responsive element 28 is preferably formed of very thin bimetallic material. A bimetallic metal of a thickness in the neighborhood of five one thousandths of an inch (0.005") is satisfactory for most instruments embodying the present invention. By using a bimetallic material of this order of thickness in the form of a relatively wide strip, very substantial power is developed when the coil is subjected to changes in temperature so that a firm and positive action is secured and the instrument will not be objectionably influenced if subjected to vibrations. For example, in the instrument shown in Fig. 1, the bimetallic strip may be approximately ¼" in width. This gives a ratio of strip width to thickness of approximately 50 to 1. In instruments where still greater power is required, a much wider strip may be used. It is perfectly practicable to use a strip an inch in width, or two hundred times the thickness of the strip. With such a construction, greater power is developed and the bimetallic element may be used to close contacts or move relatively resistant instrumentalities. A bimetallic coil of the character described can in many instances be substituted to do the work of a liquid filled thermostatic element having a large bulb and expansible bellows, such as would occupy many times the space and involve many times the cost of the bimetallic coil.

Owing to the nature of the bimetallic metal, and the relatively greater width of the metal with relation to its thickness of the metal, it is not possible to wind a coil of the form described from a simple straight strip of material as has been customary in the making of bimetallic coils. Any attempt to wind a double coil of the character shown out of bimetallic material having the characteristic dimensions described would result in tearing or completely deforming the strip and would also result in setting up such internal stresses therein as would prevent its proper functioning.

Figure 8:
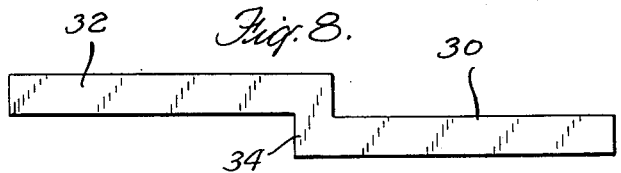
Fig. 8 is a plan view of a modified form of blank.
Figure 7:
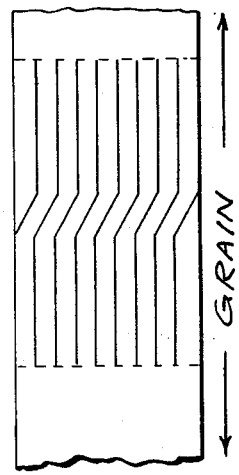
Fig. 7 is a plan view of a strip of bimetallic material showing how the blanks of the form shown in Fig. 6 may be cut therefrom.

In accordance with the present invention, therefore, an offset blank is first formed of the bimetallic material, the shape of the blank being such that it may be wound into the double coil portions 30 and 32 connected by the bridge convolution 34. One preferred form of blank is illustrated in Figs. 6 and 7. As shown in Fig. 6, the blank comprises two longitudinally-extending ends which are coiled to form the coil portions 30 and 32 and are, therefore, designated by numerals 30 and 32, respectively, these two portions being offset slightly more than the width of the strip so that when they are wound into coil form there is a slight clearance between the two coils and which is indicated at 56 in Fig. 4. The end portions 30 and 32 are connected by the bridge convolution portion 34, which may be diagonal, curved or a straight transverse portion (Fig. 8). The blanks are preferably so formed as to have the grain of the metal resulting from the direction in which it is rolled extend longitudinally of the blank. To accomplish this result, blanks may be cut from a rolled strip of the material in accordance with the layout shown in Fig. 7. This will result in the blanks having the grain extending longitudinally and will leave little waste. The particular forms of blank illustrated in Figures 6, 7 and 8 and of the coils formed therefrom form the subject matter of a divisional application, Serial No. 207,890, filed by me January 11, 1951, and are therefore not claimed in this case.

In some instances it may be more economical to form the blanks from a straight strip of material. One method of accomplishing this is shown in Figs. 11 and 12. Fig. 11 shows the straight strip of material provided with a series of V-shaped notches 60 in one side thereof and a similar series of notches 62 in the other side. These two series are offset longitudinally to permit the strip to be bent in one direction opposite one series of notches and in the opposite direction opposite the other series of notches as shown in Fig. 12 so that an offset blank is formed similar in shape to that illustrated in Fig. 6. This blank may then be coiled into the form of coil shown in Figs. 1, 4 and 5.

Figs 13 and 14 show another way of forming an offset blank out of a straight strip of material. As here illustrated each end of the strip is bent aboout a 45-degree line (66 and 68) so as to provide two offset strips extending from a central bridge portion 70. One part of the strip is bent over in one direction and the other in the opposite direction. Thus the bimetallic elements of the two strip portions retain their original relationship so that the effect of the two coils is cumulative as in the constructions already described.

By using the blanks comprising the parallel offset end portions, as shown in Figs. 6, 8, 12 and 14, it will be seen that the end portions may be coiled by a straight winding operation into the double coil formation shown in Figs. 1, 4 and 5. Such coiling involves no lateral deformation of the strip and, therefore, does not tear or tend to distort the same in an objectionable manner. Furthermore, it permits the use of strips of any desired width so that a bimetallic coil may be produced capable of exerting great force when subjected to temperature change.

The double coil with the two parts connected by the bridge convolution has the characteristic that it is constrained by the bridge convolution against expansion in diameter to any great extent, almost the total force of the expansion being translated into rotary movement tending to rotate the rotatable arbor of the instrument. This produces the maximum turning movement of the pointer and also results in the coil having very small expansion in diameter. The latter characteristic is very important as it permits the coil to be mounted in a casing with very little clearance. This brings the outer convolutions of the bimetallic metal closer to the ambient medium, the temperature of which is intended to be measured. Furthermore, the total capacity of the casing may be made less and especially if the casing is filled with a suitable heat conducting liquid, the coil will respond with extreme rapidity to temperature changes.

In the construction shown in Figs. 1 to 5, the temperature-responsive end of the instrument 24 comprises a thin metal casing 26, one end of which is closed by the cap or plug 38 and the other end of which is formed into a neck 80 of reduced diameter which is welded or otherwise secured to the tubular stem 22. In order to keep as much of the liquid as possible from leaking into the stem, the end of the stem is provided with a valve seat 82 against which rests a valve washer 84 having a flat face fitting against the valve seat. The washer 84 may be yieldingly pressed against the valve seat by a light coiled spring 86, the other end of which bears against a washer 88 surrounding the arbor and resting against the end of the bimetallic coil. As the washer 84 has a flat face, it may slide laterally over the valve seat in case the arbor is moved out of exact axial alignment with the axis of the tubular stem 22. Thus the arbor will rotate freely without binding at all times. The valve washer 84 need not be absolutely tight because the liquid in the casing cannot pass all the way up the tubular stem if the head of the instrument is tightly sealed. In such case, the air is trapped in the head of the instrument inside of the stem and, therefore, prevents the liquid from passing freely into the instrument head irrespective of the position of the thermometer. However, the use of the valve washer is desirable to help in keeping the liquid out of the stem and confining it in the casing surrounding the bimetallic coil.

Figure 9:
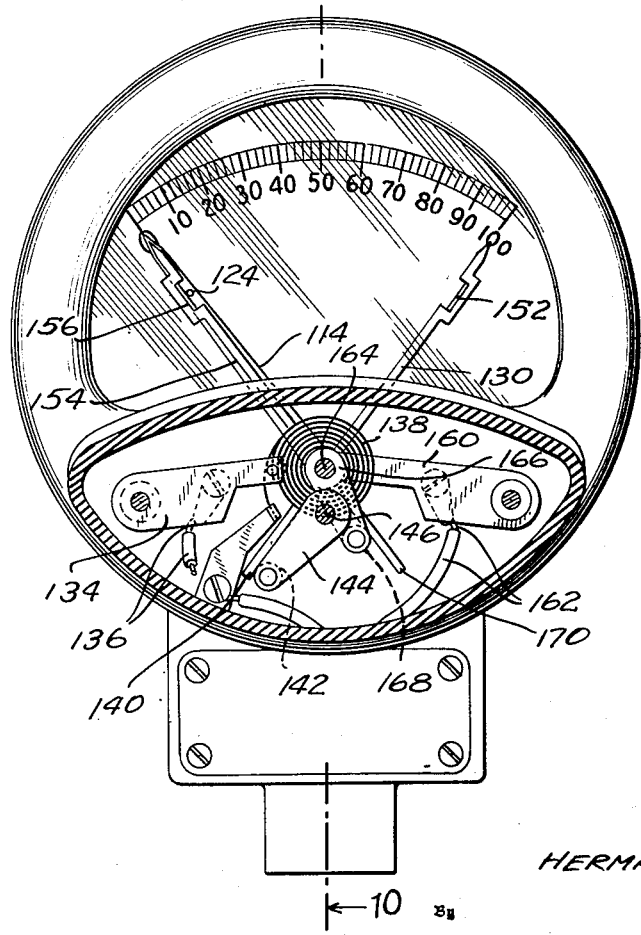
Fig. 9 is a view partly in horizontal section of the head of a contact closing thermometer.

The bimetallic coil of the present invention finds particular utility in an instrument or apparatus in which more force is required to be exerted than in the case of an ordinary indicating thermometer. For example, it is particularly useful in connection with contact thermometers which are arranged to close or open a contact upon reaching a particular point. Figs. 9 and 10 show a maximum and minimum contact thermometer embodying the invention. In Fig. 10, 24 is the thermo-responsive element or "bulb" of the thermometer which contains a bimetallic coil of the form shown in Figs. 1, 4 and 5. The bimetallic strip may, however, be wider so as to have more power. This coil turns the arbor 44 inside of the stem 22. In the construction shown, the pointer of the thermometer which is turned by the arbor forms one of the electric contact elements and is, therefore, insulated from the arbor. As shown, the arbor carries a flange 100 at its upper end on which is fixed an insulating flange 102 carrying an insulating bushing 104 surrounding the projecting end of the arbor. A sleeve 106 surrounds the bushing and is provided with a flange 108 which is fastened to the insulating flange 102 by a screw 110. Another screw 112 secures the insulating flange to the arbor flange 100. The sleeve 106 and flange 108 are thus rotated by the arbor. The instrument pointer 114 is carried by the flange 108. Attached to the sleeve 106 is a hair spring 116, the outer end of which is fixed to an arm 118, mounted in the casing 120 of the instrument but insulated therefrom. The end of a wire 122 is electrically connected to the arm 118 so that the pointer 114 is in electrical connection with the wire through the sleeve 106, hair spring 116 and arm 118. The pointer 114 carries a contact pin 124. Maximum and minimum contact hands are adjustably mounted in the casing. A maximum contact hand 130 is mounted on a pivot screw 132 which is carried by a bar 134 carried by the instrument casing but insulated therefrom. A wire 136 carries current to the arm 134. A hair spring 138 is connected to the hub of the hand 130, the outer end of the hair spring being connected to the arm 134 so that the hair spring conducts current from the arm to the hand. For adjusting the hand, the latter is provided with an extension 140 which rests against a pin 142 carried by an adjusting crank 144 mounted on a rotatable stud 146 carried in the casing. The stud has a slotted head 148 by which it may be set so as to cause the crank pin 142 to push the extension 140 of the hand 130 against the tension of the hair spring 138 to its desired position of adjustment. The hand 130 is capable of limited movement on the stud 146 to which it is yieldably attached by a relatively stiff spring 150. The spring 150 holds the hand in the position of adjustment determined by the rotation of the stud 146 but will permit limited movement of the hand when engaged by the contact pin on the pointer 114 so as to prevent bending or breakage of the parts. The hand 130 is provided with a knife edge 152 forming a contact edge for engagement with the pin on the pointer. The minimum hand 154 having a contact edge 156 is mounted on the pivot screw 158 carried by the arm 160 which is connected to the lead wire 162. A rotatable stud 164 mounted in the casing is connected to a crank arm 166 which carries a crank pin 168 engaging in extension 170 on the arm 154. The hand 154 is connected to the arm 160 through hair spring 172. By using a double bimetallic coil of sufficient width of material as the thermo-responsive element of the thermometer, the pointer 114 will be moved with sufficient firmness to cause the pin 124 to bear against one or the other of the knife edges 152 or 156 with enough pressure to make a good contact and such contact will be steadily maintained and the pin will not be moved out of contact due to vibration. With a weak bimetallic spring of narrow width, such as has heretofore been usually employed in bimetallic thermometers, satisfactory contact cannot be maintained in this manner.

Figs. 15 to 19 show another form of bimetallic coil and the blank for making the same possessing some of the characteristics of the bimetallic coil already described. In accordance with this construction a duplicate bimetallic coil is provided which, however, is not formed of a single offset blank, but is formed of two parallel strips of bimetallic metal, one of which is reversed with respect to the other strip. That is to say, one strip has the metal of greater coefficient of expansion on the outside and the other strip has the metal of greater coefficient of expansion on the inside.

Fig. 15 shows the two strips 200 and 202 with one reversed with respect to the other, as described, the two strips being spaced slightly apart and firmly united at their outer ends. In the construction shown, the strip 200 has an ear 204 at the one side of its outer end which is welded at 206 to the corner of the other strip 202. The inner end 208 of one of the strips, for example, strip 200, is welded to the arbor 44 of the thermometer, as shown in Fig. 16, while the inner end of the strip 202 is welded to a fixed shaft (not shown). The two strips are coiled in the same direction from inside to outside, so that a double coil is provided, the united ends of the two coils forming a free or unanchored end 210. Owing to the fact that the two coils are reversed with respect to the coefficients of expansion of the metal layers, the effect of the two coils is cumulative, thereby producing double the rotation of the arbor from that which would be obtained if a single coil were used.

In a coil of the kind shown in Figs. 15 to 18, the outer convolutions tend to expand outwardly to a certain extent so that the total diameter of the coil enlarges somewhat. This movement is greater in the outer and larger convolutions than in the inner turns. In order to restrain this outward movement of the outer turns and particularly of the free end 210 and adjacent parts of the coils, it is desirable to stiffen the outer parts of the strips so as to reduce such outward movement and cause the expansive effect of the bimetallic metal to exert itself as far as possible in rotating the arbor. This stiffening of the outer convolutions is preferably progressive, being at a maximum near the free end of the coil and decreasing inwardly. In the construction shown, this progressively stiffening effect is accomplished by pressing a tapered rib from the metal of each strip, such ribs being indicated at 212 and 214. These ribs are larger and, therefore, stiffer near the outer ends of the coil. In this construction, as well as that previously described, a very compact bimetallic element is produced and one in which the bimetallic material may be of any desired width, thereby making available any operating force necessary. Both parts of the coil are, furthermore, mounted on shafts attached to their inner ends, resulting in very easy and efficient mounting of the coil. It is unnecessary to connect the free outer end of the coil to the shell of the instrument or any other support in the outside of the coil.

While I have illustrated and described in detail certain preferred forms of my invention, it is to be understood that changes may be made therein and the invention embodied in other structures. I do not, therefore, desire to limit myself to the specific construction illustrated, but intend to cover my invention broadly in whatever form its principles may be utilized.

What is claimed is:

1. A blank of bimetallic metal for forming into a double coil composed of two parallel spirally wound portions connected by a bridge portion, said blank being much wider than its thickness and comprising two straight parallel coil-forming portions offset laterally by an amount slightly wider than the width of said portion, said parallel portions being connected by a bridge-forming portion, said blank being formed from a straight strip of metal having a series of notches cut in each edge thereof, said two series of notches being relatively displaced longitudinally and the blank being bent opposite to each series of notches so as to offset the end portions of the strip with respect to each other.

2. A bimetallic temperature-responsive element comprising two spiral coil portions connected at their outer ends by a bridge member, the inner end of one coil portion being wrapped around the outside of a fixed shaft and fixed thereto and an inner end of the other coil portion being wrapped around the outside of an arbor and fixed thereto, said shaft and arbor having grooves therein bounded at one side by shoulders of a height approximately equal to the thickness of the bimetal, the bottom walls of the grooves curving out in a spiral, said grooves receiving the inner ends of said coil portions.

3. A temperature responsive device comprising a long tubular stem, a casing of heat conducting material sealed on the end of said stem, a liquid tight closure for the outer end of said casing, an arbor rotatably mounted in the stem and having its end projecting into the casing, a shaft carried by the closure at the end of the casing, said shaft projecting into the casing towards the end of said arbor and in axial alignment therewith, and a duplex bimetallic coil wound from a strip of bimetallic material of much greater width than thickness, said coil comprising two coaxial coil portions having their outer convolutions connected by a bridge member, the inner convolution of one coil portion surrounding and being attached to said shaft and the inner convolution on the other coil portion surrounding and being attached to said arbor, and liquid sealing means around the arbor at a point where the arbor enters the casing, said casing being filled with a heat conducting liquid.

4. A temperature responsive device comprising a stem, a casing of heat conducting material mounted on said stem, a closure for the outer end of said casing, an arbor rotatably mounted in the stem and having its end projecting into the casing, a shaft carried by the closure at the end of the casing, said shaft projecting into the casing towards the end of said arbor and in axial alignment therewith, a duplex bimetallic coil wound from a strip of bimetallic material of much greater width than thickness, said coil comprising two concentric coil portions having their outer convolutions connected by a bridge member, the inner convolution of one coil portion surrounding and being attached to said shaft and the inner convolution of the other coil portion surrounding and being attached to said arbor, said casing being filled with a heat conducting liquid, and a liquid sealing ring surrounding said arbor and yieldingly held against a seat at the end of said casing adjacent to said stem, said seat and ring having coacting faces lying in a plane normal to the axis of the arbor whereby said ring is capable of limited lateral movement with respect to said seat.

5. A bimetallic thermometer comprising a long slender stem, a casing of heat conducting material mounted on said stem, an arbor rotatably mounted in the stem and having its end projecting into the casing, a bimetallic coil in said casing and attached to said arbor, said casing being filled with a heat conducting liquid, and a liquid sealing ring surrounding said arbor and yieldingly held against a seat at the end of said casing adjacent to said stem, said seat and ring having coacting faces lying in a plane normal to the axis of the arbor whereby said ring is capable of limited lateral movement with respect to said seat, a hollow indicator head attached to the outer end of said stem, said head being airtight, the outer end of the arbor projecting into said head, and indicating means in said head operatively connected with said arbor.

6. A thermo-responsive bimetallic coil comprising two layers of metal of uniform thickness having embossed therefrom a reinforcing rib extending lengthwise of the metal from which the coil is formed, said rib decreasing in rigidity from the outside of the coil inwardly.

7. A thermo-responsive bimetallic coil comprising two layers of metal of uniform thickness in which the outer turn or turns are deformed transversely of their length so as to make them stiffer than the inner turns.

8. A duplex bimetallic coil for a temperature-responsive device comprising two spiral coils arranged in axial alignment and firmly connected together at their outer ends, one of said coils being anchored at its inner end to a fixed support, and the other coil being anchored at its inner end to a part to be moved, the relationship of the metals in the two coils being reversed so that in one coil the metal of the greater coefficient of expansion is on the outside, and in the other coil the metal of the greater coefficient of expansion is on the inside, each of said coils having a reinforcing rib extending lengthwise of the metal from which the coil is formed, said ribs being of varying depth and deepest near the outer ends of the coils.

9. A duplex bimetallic coil for a temperature-responsive device comprising two spiral coils arranged in axial alignment and firmly connected together at their outer ends, one of said coils being anchored at its inner end to a fixed support, and the other coil being anchored at its inner end to a part to be moved, the relationship of the metals in the two coils being reversed so that in one coil the metal of the greater coefficient of expansion is on the outside, and in the other coil the metal of the greater coefficient of expansion is on the inside, each of said coils being variably stiffened from the outside inwardly, the stiffening decreasing in rigidity from the outside inwardly.

10. A thermo-responsive bimetallic element comprising two layers of metal of different coefficients of expansion and each of uniform thickness, and firmly united together, said element having embossed therefrom a reinforcing rib extending lengthwise of the element, said embossed rib varying in depth longitudinally so as to give the element differential rigidity longitudinally thereof.

HERMAN SCHLAICH.

REFERENCES CITED

The following references are of record in the file of this patent:

UNITED STATES PATENTS

| Number | Name | Date |
|---|---|---|
| 430,853 | Hodgson | June 24, 1890 |
| 1,058,290 | Corey | Apr. 8, 1913 |
| 1,292,991 | Barstow | Feb. 4, 1919 |
| 1,479,784 | Bosworth | Jan. 8, 1924 |
| 1,725,607 | Wolfard | Aug. 20, 1929 |
| 2,000,092 | Norwood | May 7, 1935 |
| 2,019,221 | Hastings | Oct. 29, 1935 |
| 2,058,426 | Drake | Oct. 27, 1936 |
| 2,109,169 | Field | Feb. 22, 1938 |
| 2,131,544 | Weiland | Sept. 27, 1938 |
| 2,144,915 | Derby | Jan. 24, 1939 |
| 2,180,362 | Leonard | Nov. 21, 1939 |
| 2,230,711 | Yon | Feb. 4, 1941 |
| 2,241,902 | Drapeau | May 13, 1941 |
| 2,284,082 | Bloch | May 26, 1942 |
| 2,317,831 | Vaughan | Apr. 27, 1943 |
| 2,365,487 | Murray | Dec. 19, 1944 |